July 11, 1967 J. D. ADAIR 3,331,046
REMOTE METER READING SYSTEM
Filed Feb. 24, 1965 2 Sheets-Sheet 1

INVENTOR.
John D. Adair
BY Ralph Hammar
Attorney

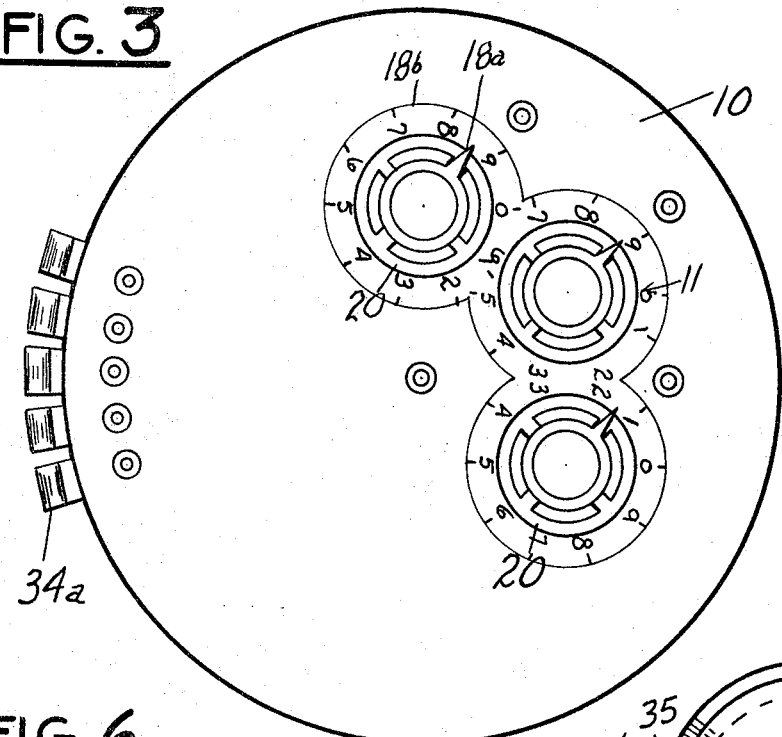
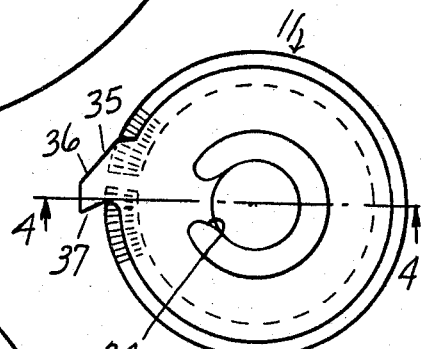
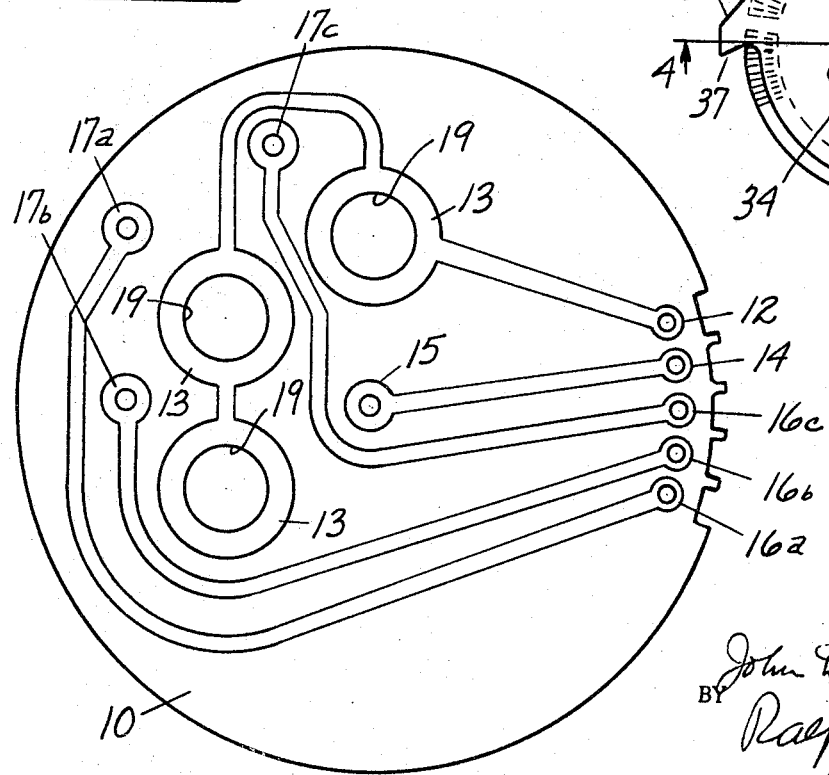

United States Patent Office 3,331,046
Patented July 11, 1967

3,331,046
REMOTE METER READING SYSTEM
John D. Adair, Huntingdon Valley, Pa., assignor to American Meter Company, Incorporated, Philadelphia, Pa., a corporation of Delaware
Filed Feb. 24, 1965, Ser. No. 434,905
5 Claims. (Cl. 338—129)

ABSTRACT OF THE DISCLOSURE

Apparatus for remote reading of meters having a printed circuit board adapted to be mounted adjacent the meter register. Each register shaft drives a potentiometer having a hub journaled in the printed circuit board and a resistance element carried by a disc of insulating material sandwiched between conductive washers respectively connected to one and the other end of a resistance element. The printed circuit board has a collector ring bearing on one of the washers, a wiper bearing on the other washer, a slider bearing on the resistance element, and terminals for connecting each potentiometer into an indicating circuit in which each potentiometer voltage produces an indication corresponding to the position of the associated register shaft.

---

This invention is intended to improve the remote meter reading systems of Patents 3,054,095 and 3,069,669 and application Ser. No. 114,258 by simplifying the potentiometers which provide the electrical signals proportional to the positions of the pointers of the meter register. In a preferred form, the potentiometers are mounted in an oil filled housing which replaces the meter register cover.

Figure 1:
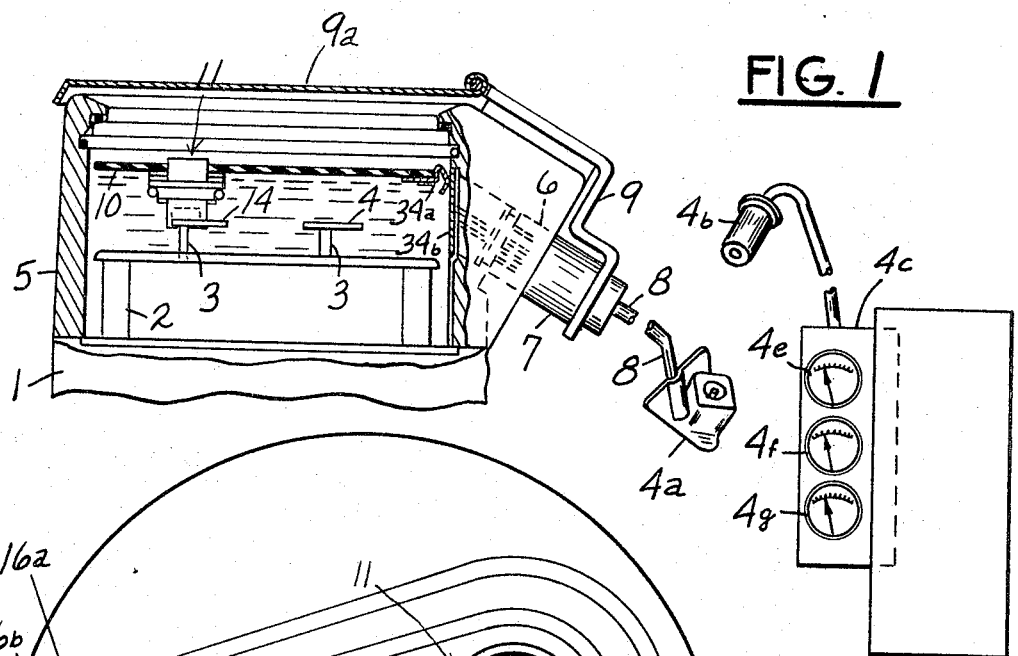
Figure 2:
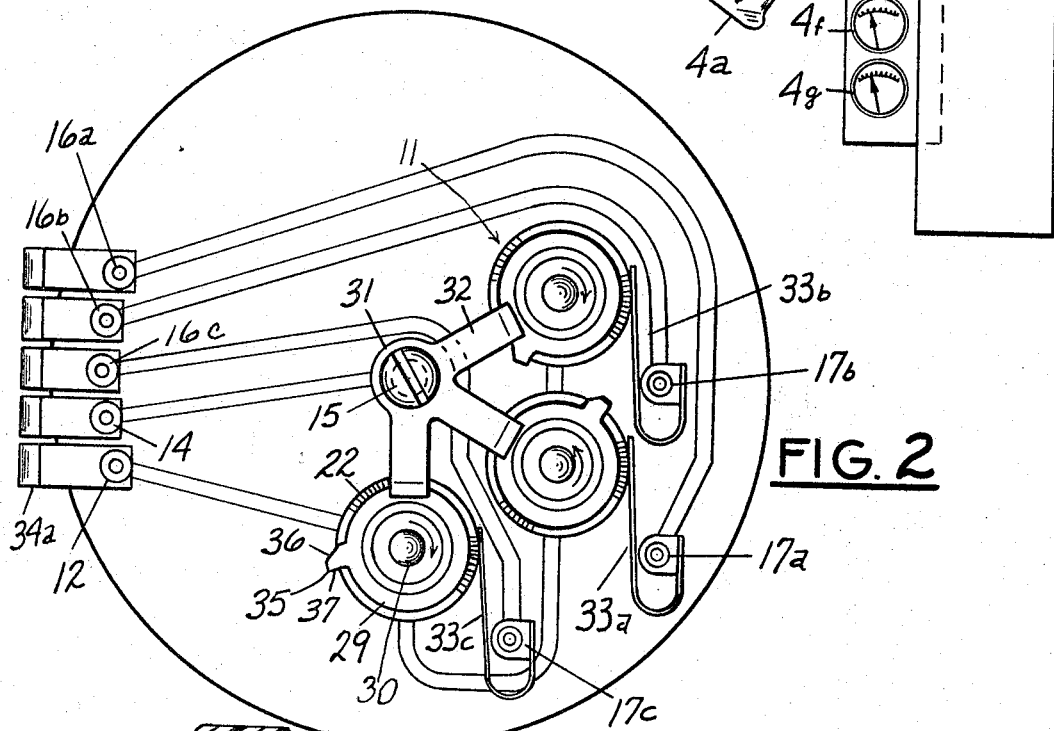
Figure 4:
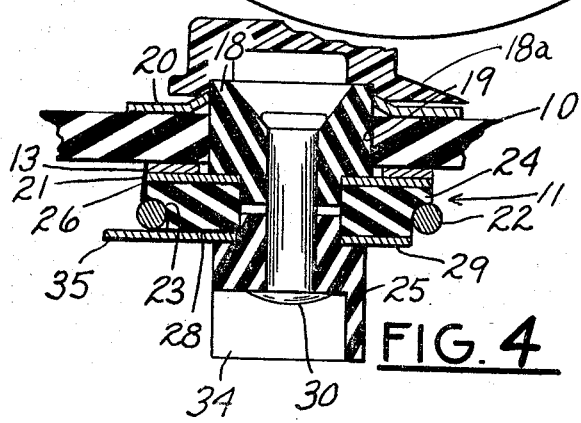

In the drawing, FIG. 1 is a diagrammatic view of a remote reader system, FIG. 2 is a bottom plan view of the potentiometer assembly, FIG. 3 is a top plan view of the potentiometer assembly, FIG. 4 is a section on line 4—4 of FIG. 5, FIG. 5 is a bottom plan view of one of the potentiometers, and FIG. 6 is a bottom plan view of the printed circuit board for the potentiometers.

In the drawing, 1 indicates the upper end of a fluid meter having the usual register 2 with a shaft 3 and pointer 4 for each order of digits to be read. With the parts so far described it would be necessary for the meter reader to visually inspect the register in order to make a record of the quantity of fluid metered. To avoid the necessity of direct inspection of the meter register, the register pointers drive potentiometers connected to a receptacle 4a remote from the meter so the meter reader can read the meter by inserting into the receptacle the plug 4b of a readout device 4c.

The potentiometers are mounted in a housing 5 having sealed in a side wall a connector 6 mating with a connector 7 at one end of a cord set 8 leading to the receptacle 4a. The connectors 6 and 7 are held in engagement by a clamp 9 which may be provided with the usual tamper proof seal (not shown). The clamp 9 also carries a hinged protective cover 9a. The housing 5 is a completely sealed unit, oil filled to prevent contamination and corrosion, which is readily mounted on the upper end of the meter.

Within the housing is a plate 10 of insulating material of the kind used for printed wiring boards on which are mounted a plurality of potentiometers 11. On the under side of the plate 10 is printed the wiring pattern shown in FIG. 6 which comprises an input terminal 12 connected to three collector rings 13, an input terminal 14 connected to a terminal 15 and three terminals 16a, 16b and 16c respectively connected to slider terminals 17a, 17b 17c. When the meter reader connects his readout device into the remote receptacle, the power supply is connected across terminals 12 and 14 and the meter readout signals appear between terminal 12 and terminals 16a, 16b and 16c respectively.

The meter readout signals are obtained from three identical potentiometers, each having a hub 18 of insulating material journaled in a hole 19 at the center of one of the collector rings 13. The hub is inserted through the hole 19 and is resiliently held in place by a spring washer 20 which holds a metal washer 21 against the collector ring 13, and establishes the electrical connection from the input terminal 12. Each hub is associated with a pointer 18a which cooperates with a dial 18b printed on the board to enable the register to be read directly. The potentiometers have annular resistance windings 22 mounted in a seat 23 in a disc 24 of insulating material clamped between the hub 18 and a hub 25 of insulating material. The lead wire 26 at one end of the potentiometer is clamped between the upper side of the disc 24 and the metal washer 21 which bears on the slip ring 13. The other lead wire 28 of the potentiometer is clamped between the disc 24 and a washer 29. A rivet or eyelet 30 holds the hubs 18 and 25 together and establishes the electrical contact between the washers 21 and 29 and the leads 26 and 28. A wiper 31 is mounted on the contact 15 and has three spring arms 32 which ride on the washer 29 and establish connection from the other power terminal 14 to the resistance elements of the potentiometers.

On each of the contacts 17a, 17b and 17c is mounted a slider 33a, 33b, 33c which rides on the associated potentiometer resistance element 22. The hub 25 of insulating material has a drive slot 34 which fits over the associated register pointer 4 and causes each potentiometer to turn in synchronism with its pointer. This means that as the fluid flows through the meter, the potentiometers rotate to positions corresponding to the quantity of fluid which has passed through the meter. When the power supply is connected across terminals 12 and 14, the voltages between terminal 12 and the terminals 16a, 16b and 16c correspond to the respective positions of the register pointers 4.

Each of the terminals 12, 14, 16a, 16b and 16c is connected to its contact finger 34a which engages a mating contact 34b in the connector 6. Only one of the contacts 34a, 34b is shown in FIG. 1. When the meter reader inserts the plug 4b in the receptacle 4a, each of the terminals 12, 14, 16a, 16b and 16c is connected to the readout device 4c. A battery in the readout device is connected across the terminals 12, 14. Galvanometer 4e is connected to terminals 12, 16a. Galvanometer 4f is connected to terminals 12, 16b. Galvanometer 4g is connected to terminals 12, 16c. The reading on each galvanometer corresponds to the position of the associated register pointer. The scale of each galvanometer is from zero to 10 and since there is a galvanometer for each order of digits, the meter reader reads the scales of the galvanometers in the same manner as he would read the meter register.

The collector ring 13 and lead wire 26 of each potentiometer corresponds to digit "0" and the terminal 15 and lead wire 28 corresponds to the digit "10" for its order of digits. As the wiper moves from the "10" to the "0" position, there is a possibility of ambiguity due to contact resistance. This is eliminated by the ramp or cam 35 on each of the washers 29. When the wiper reaches the end of the resistance 22 connected by conductor 28 to terminal 15, the wiper rides up the inclined surface 36 of the ramp, thereby maintaining contact with terminal 15. Upon a slight additional rotation of the potentiometer, the wiper falls off the end 37 of the ramp and snaps onto the resistance 22 adjacent the conductor 26 connected to the terminal 13. Because of this ramp, there is always an unambiguous connection of each wiper to its associated potentiometer resistance.

The potentiometers have identical parts, the sole difference being in the direction of rotation. For the potentiometers which rotate in a counterclockwise direction, the ramp 35 is as shown in FIG. 5 while the inclination of the ramp is in the opposite direction for the potentiometers which rotate in a clockwise direction. The only difference is in the manner of assembly. Reversal of the leads 26 and 28 and reversal of the washer 29 to change the direction of ramp 35 is all that is required from clockwise to counterclockwise rotation. Since the usual meter register has pointers rotating in both clockwise and counterclockwise directions, it is necessary that each potentiometer be able to rotate in the same direction as the associated pointer.

Assembly of the potentiometers into the plate 10 is completed by pressing the spring washers 20 on the hubs 18 and by mounting the wiper 31 on terminal 15. This completes the electrical connections to the terminals 12, 14, 16a, 16b and 16c. Mounting the plate 10 in the housing 5 completes the connections from the terminals 12, 14, 16a, 16b and 16c to the receptacle 6 through contacts 34a and 34b. Mounting the housing 5 on the meter insures correct positioning of the potentiometers because the pointers 4 must enter slots 34 in the potentiometer drive hubs 25.

What is claimed as new is:

1. An indicating mechanism in an apparatus for remote reading of meters having a plurality of dials each including a dial pointer, said mechanism comprising a plurality of potentiometers, one for each pointer, each potentiometer having a hub and an annular resistance mounted on and surrounding the hub and having ends adjacent each other, a printed circuit board adapted to be mounted adjacent the dials and having a socket rotatably receiving each potentiometer hub, each hub having a drive slot adapted to fit over the associated pointer and causes the potentiometer to turn in synchronism with its pointer, a collector ring on said printed circuit board surrounding each socket and presented to said contact, a contact on each potentiometer connected to one end of its resistance, said contact bearing on said collector ring, a washer connected to the other end of the resistance, a wiper bearing on each washer, a slider for each potentiometer mounted on the board and bearing on the resistance of its potentiometer, a printed wiring pattern having power supply terminals connected respectively to the collector rings and to said wipers and a slider terminal connected to each slider, a socket remote from the meter having terminals corresponding respectively to said power supply and slider terminals, a cable having conductors respectively connecting the power supply and slider terminals with the corresponding socket terminals, and readout means having connectors for association with the socket terminals.

2. An indicating mechanism for association with a meter having a dial and a dial pointer, said mechanism comprising a potentiometer having a hub and an annular resistance mounted on and surrounding the hub and having ends adjacent each other, a printed circuit board adapted to be mounted adjacent the dial and having a socket rotatably receiving the potentiometer hub, the hub having a drive slot adapted to fit over the pointer and causes the potentiometer to turn in synchronism with the pointer, a collector ring on said printed circuit board surrounding the socket and presented to the contact, a contact on the potentiometer connected to one end of the resistance, said contact bearing on said collector ring, a washer connected to the other end of the resistance, a wiper bearing on the washer, a slider for the potentiometer mounted on the board and having an associated wiper bearing on the resistance of the potentiometer, and a printed wiring pattern having a slider terminal connected to the slider and power supply terminals connected respectively to the collector ring and to said wiper.

3. An indicating mechanism in an apparatus for remote reading of meters having a register with a register shaft, said mechanism comprising a supporting structure adapted to be mounted in association with the register, a potentiometer having a disc with a hub at its center and an annular resistance surrounding the hub and having ends adjacent each other, means for establishing a drive connection from the register shaft to the hub of the potentiometer, conducting washers clamped to opposite sides of the disc and respectively connected to one and the other end of the resistance, a collector ring presented to and bearing on one of the washers, a wiper bearing on the other washer, a slider bearing on the resistance, terminal means connected respectively to the collector ring, wiper and slider for connecting the potentiometer into an electrical circuit, and means on said supporting structure for rotatably mounting the hub.

4. Apparatus for association with a meter having a register with a register shaft, a printed circuit board having a bearing coaxial with the shaft, a disc journaled in the bearing, an annular resistance encircling the disc and having ends adjacent each other, conducting washers clamped to opposite sides of the disc and respectively connected to one and the other end of the resistance, a wiring pattern on the board having a collector ring presented to one of the washers, said one of the washers bearing on said collector ring, a wiper bearing on the other washer, a slider bearing on the resistance, said other washer having a projection connected to one of the ends of the resistance for maintaining contact with the wiper and said one end of the resistance while the disc rotates through the space between the ends of the resistance, said projection having an abrupt shoulder from which the wiper falls onto an adjacent end of the resistance with a snap action, terminal means connected respectively to the collector ring, wiper and slider for connecting the potentiometer into an electrical circuit, and a drive connection for association with said shaft to the disc.

5. A potentiometer comprising a printed circuit board, a disc journaled on one face of the board, an annular resistance encircling the disc and having ends adjacent each other, conducting washers clamped to opposite sides of the disc and respectively connected to one and the other end of the resistance, one of the washers being presented to said one face of the board, a wiring pattern on said one face of the board having a collector ring presented to and bearing on said one of the washers, a wiper bearing on the other washer, a slider bearing on the resistance, terminal means connected respectively to the collector ring, wiper and slider for connecting the potentiometer into an electrical circuit, and means for rotating the disc.

References Cited

UNITED STATES PATENTS

| 1,672,290 | 6/1928 | Wiegand | 338—150 X |
| 3,119,089 | 1/1964 | Murry | 338—174 |

FOREIGN PATENTS

| 1,177,238 | 9/1964 | Germany. |
| 500,522 | 2/1939 | Great Britain. |

RICHARD M. WOOD, *Primary Examiner.*

J. G. SMITH, *Assistant Examiner.*